(12) United States Patent
Baker (10) Patent No.: US 7,938,193 B2
(45) Date of Patent: May 10, 2011

(54) VEHICLE MOUNTED EDGING DEVICE

(76) Inventor: Bruce Lee Baker, Amarillo, TX (US)

( * ) Notice: Subject to any disclaimer, the term of this patent is extended or adjusted under 35 U.S.C. 154(b) by 0 days.

(21) Appl. No.: 12/105,158

(22) Filed: Apr. 17, 2008

(65) Prior Publication Data

US 2009/0260841 A1    Oct. 22, 2009

(51) Int. Cl.
*A01D 43/16* (2006.01)
(52) U.S. Cl. ............................. 172/15; 56/256
(58) Field of Classification Search .............. 172/13–18, 172/272, 433, 246, 257, 273, 762, 763, 773–776, 172/547, 558, 817, 766; 280/901; 296/3; 37/268, 269, 105, 403, 466, 903; 56/14.9, 56/15.5, 15.9, 256
See application file for complete search history.

(56) References Cited

U.S. PATENT DOCUMENTS

| | | | | |
|---|---|---|---|---|
| 3,019,844 A * | 2/1962 | Key | ................................. | 172/15 |
| 3,322,201 A * | 5/1967 | Ballister | ......................... | 172/14 |
| 3,656,555 A * | 4/1972 | Johns et al. | ..................... | 172/16 |
| 3,907,039 A * | 9/1975 | Remley et al. | .................. | 172/15 |
| 4,046,200 A * | 9/1977 | Mullet et al. | ..................... | 172/14 |
| 4,168,861 A * | 9/1979 | Carroll | ........................... | 298/22 J |
| 4,200,155 A * | 4/1980 | Mullet et al. | ..................... | 172/14 |
| 4,437,523 A * | 3/1984 | Isbell | ............................... | 172/13 |
| 4,629,006 A * | 12/1986 | Mullet et al. | ..................... | 172/15 |
| 4,691,784 A * | 9/1987 | Mullet et al. | ..................... | 172/15 |
| 4,718,221 A * | 1/1988 | Wessel et al. | .................. | 56/16.9 |
| 4,930,580 A * | 6/1990 | Fuss et al. | ......................... | 172/15 |
| 5,156,218 A * | 10/1992 | Metzler et al. | .................. | 172/15 |
| 6,036,275 A * | 3/2000 | Hansen et al. | ............... | 298/17 T |
| 7,128,164 B1 * | 10/2006 | Boland | ........................... | 172/15 |

* cited by examiner

*Primary Examiner* — Robert E Pezzuto
*Assistant Examiner* — Matthew D Troutman
(74) *Attorney, Agent, or Firm* — Nicholas A. Taylor (57) ABSTRACT

The vehicle mounted edging device provides a safe and efficient means for edging grass and soil adjacent to improved surfaces. The device is attached to the remotely actuated bed of a utility vehicle and utilizes the lifting capabilities of the bed for its operation. When the disc is in the cutting position, the operator of the utility vehicle positions the vehicle near the edge of the surface to be maintained and lowers the remotely actuated bed of the utility vehicle to place the disc adjacent to the surface to be maintained. The operator then drives the vehicle parallely to the edge of the path and remove the unwanted grass. The vehicle mounted edging device effectively guides the utility vehicle along the edge of the path so that minimal steering is required and is oriented to enable the operator to easily monitor the edging operation.

9 Claims, 8 Drawing Sheets

VEHICLE MOUNTED EDGING DEVICE

FIELD OF THE INVENTION

This invention relates to new and useful improvements in edgers and more particularly to vehicle mounted edgers. Specifically, this invention relates to a device used to edge grass and soil which tends to extend from lawns and grassy areas over pathways, sidewalks, curbs, roads, and the like, in a safe and efficient manner.

BACKGROUND

A variety of lawn edgers are commonly utilized to remove unwanted grass, weeds, and soil that typically extends from areas of vegetation onto improved surfaces such as pathways, sidewalks, curbs, and roads. This process is commonly referred to as edging. In residential applications, edging is typically performed using motorized devices that are manually pushed or carried by a person. This approach is suitable because the amount of edging to be performed in most residential applications is limited by the size of the person's yard. However, in other applications where edging operations involve a greater area of land, such as pathways in parks, cart paths on golf courses, curbs on public roads, parking lots in business parks, it is advantageous for edging to be performed by an operator on a self-propelled vehicle such as a tractor or utility vehicle. Accordingly, a variety of vehicle mounted edgers have been designed and configured for these applications.

In some cases, the prior art utilizes a vehicle mounted edger design that requires extensive modifications to the subject vehicle prior to installation. In these cases, it is also common for the installation and removal of the vehicle mounted edger to be somewhat cumbersome. It would be advantageous if a vehicle mounted edger was designed to readily interface with an existing vehicle without requiring extensive alterations. It would also be advantageous for the vehicle mounted edger to be easily installed and removed from the vehicle. These features would allow one vehicle to be utilized in many different manners without significantly impacting the other uses of the vehicle.

In some cases, the prior art requires an auxiliary power source or significant manual exertion by the operator to effectuate its purpose. It would be advantageous for a vehicle mounted edger to utilize the existing power sources of the vehicle or to be configured to minimize the manual exertion required by the operator. In some cases, the prior art attempts to design a vehicle mounted edger that compensates for the inability of the operator to maintain a course that keeps the cutting mechanism in proper alignment with the surface being edged. It would be advantageous if the vehicle mounted edger assisted the operator in guiding the vehicle so the edging device remains positioned between the grass and the improved surface. In other cases, the prior art positions the cutting mechanism in a location that is difficult for the operator to view while driving the vehicle. It would be advantageous if the operator of the vehicle could easily view the cutting mechanism while driving the vehicle so that the driver could pay requisite attention to upcoming obstacles while monitoring the edging operation. In that regard, it is desirable for the cutting mechanism to be positioned in the operator's clear view with minimal obstruction of the path ahead.

In some cases, the prior art provides complicated edging devices with numerous components subject to wear, damage, or failure. In these cases, the numerous components may complicate the manufacturing process as well as increase the likelihood additional maintenance and repairs will be required during service. It would be advantageous to have a vehicle mounted edger that utilized a minimal number of durable and reliable components that are simple to manufacture.

Information relevant to attempts to address these problems can be found in U.S. Pat. Nos. 3,907,039, 4,200,155, 4,629,006, 4,930,580, 3,019,844, 7,128,164, and 4,691,784. However, each one of these references suffers from one or more of the following disadvantages: auxiliary power is required is needed to operate the cutting mechanism, manual engagement by the operator is required, manual exertion of forces by the operator is required, the edging device cannot be readily observed by the operator, precise steering is needed to properly position the edger, multiple components are subject to failure or wear, multiple components increase manufacturing difficulty, installation and removal is cumbersome, and extensive vehicle modifications are required. For the foregoing reasons, there is a need for a vehicle mounted edging device that overcomes the shortcomings of the prior art.

SUMMARY

The present invention is directed to a vehicle mounted edging device that satisfies this need because: it utilizes existing features of a utility vehicle without requiring auxiliary power or major modifications to the vehicle; it can be readily attached to and removed from the utility vehicle, thereby allowing the use of the vehicle in other applications; it is positioned where the operator can easily observe and monitor the cutting operations without compromising the ability to view the path ahead; it assists the operator in maintaining the position of the cutting mechanism; it is durable; it contains a minimum number of moving components; and it is simple to manufacture.

The vehicle mounted edging device is adapted to be secured to a remotely actuated bed on a utility vehicle, and consists of a body, a pivot assembly, a hub assembly, and a disc. The body is attached to the remotely actuated bed and the pivot assembly is attached to the body. The hub assembly is attached to the pivot assembly and the disc is secured to the hub assembly. The disc is positioned near a left front wheel of the utility vehicle.

In some versions, the vehicle mounted edging device adapted includes a cleaning mechanism secured to the hub assembly. In some versions, the body of the vehicle mounted edging device includes one or more mounting arms secured to the remotely actuated bed, a primary member secured to the mounting arms, one or more stabilizing arms attached to the primary member, a cutting arm attached to the primary member so that the cutting arm is oriented approximately 60 degrees from horizontal and has a lower end proximal to the left front wheel of the utility vehicle, and an arm brace attached to the cutting arm and primary member. The pivot assembly may comprise a static housing and a dynamic housing with the dynamic housing positioned inside the static housing and is capable of rotating angularly inside the static housing and being secured in various orientations.

The hub assembly may comprise a hub arm, a spindle, a hub, and a bearing positioned on the spindle. The disc may have a concave side and a convex side, with the concave surface oriented toward the left front wheel of the utility vehicle. Other disc shapes may be utilized, such as a scalloped disc or a convex disc.

The vehicle mounted edging device may be readily attached to the remotely actuated bed of a utility vehicle by inserting the mounting arms into rectangular shaped slots and securing the mounting arms. If the remotely actuated bed does not have the slots, mounting brackets may be utilized to effectuate mounting of the device. The position of the disc allows the operator to monitor the edging operation without impairing the view of the path ahead. The device is durable and has a minimum number of moving parts. The device is strong enough to assist the operator in steering the utility vehicle by guiding the utility vehicle in the direction of the surface being edged.

BRIEF DESCRIPTION OF THE DRAWINGS

These and other features, aspects, and advantages of the present invention will become better understood with regard to the following description, appended claims, and accompanying drawings where:

DETAILED DESCRIPTION

According to the present invention, a vehicle mounted edging device is disclosed. The vehicle mounted edging device is an attachment for a utility vehicle that allows an operator to use the utility vehicle as an edging device. The disclosed vehicle mounted edging device may attain many configurations. In one embodiment, the vehicle mounted edging device includes a body, a pivot assembly, a hub assembly, a cleaning mechanism, and a disc.

The body is the structural foundation of the vehicle mounted edging device. The body includes a primary member, mounting arms, stabilizing arms, an arm brace, and a cutting arm. The mounting arms are used to securely attach the vehicle mounted edging device to a remotely actuated bed on a utility vehicle. The remotely actuated bed may be actuated hydraulically, electronically, or mechanically. The mounting arms are designed to interface with rectangular shaped slots typically located at the forward corners of the remotely actuated bed. These rectangular shaped slots are common among many utility vehicles. The mounting arms are designed to fit snugly inside the slots and are removably secured to the remotely actuated bed. The mounting arms ensure that the body of the vehicle mounted edging device is secured to the remotely actuated bed.

The primary member connects the mounting arms to the stabilizing arms and provides a rigid attachment point for the cutting arm. The mounting arms, stabilizing arms, and cutting arm are permanently and securely attached to the primary member. The stabilizing arms provide additional stability to the primary member during edging operations. The stabilizing arms are rigidly attached to the primary member and are positioned so the stabilizing arms touch the bottom of the remotely actuated bed. Although the stabilizing arms are not secured to the bottom of the remotely actuated bed, the stabilizing arms are positioned on the opposed side of the primary member with respect to the cutting arm. Thus, the stabilizing arms counteract the forces imposed by the cutting arm during an edging operation.

The cutting arm is the structural element that supports the pivot assembly. The cutting arm is rigidly attached to the primary member and the pivot assembly is rigidly attached to the cutting arm. The arm brace is located at the connection point between the cutting arm and primary member. The arm brace provides additional structural support for the interface between the cutting arm and primary member. The arm brace is securely and permanently attached to the cutting arm and primary member.

The pivot assembly serves as an adjustable connection between the hub assembly and the cutting arm. The pivot assembly includes a static housing, a dynamic housing, a pin, and a key. The pivot assembly allows the operator to manually reconfigure the vehicle mounted edging device from edging mode to transport mode. The hub assembly includes a hub arm, a spindle, a hub, and a bearing. The hub assembly serves as the interface between the disc and the pivot assembly and allows the disc to rotate during the edging operation. A cleaning mechanism is attached to the hub arm and removes dirt, grass, and debris from the disc during the edging operation.

The disc is the mechanism that actually severs the grass, weeds and soil that extends onto the improved surface to be edged. The disc is secured to the hub and rotates angularly as the utility vehicle moves linearly along the surface being edged.

Figure 1:
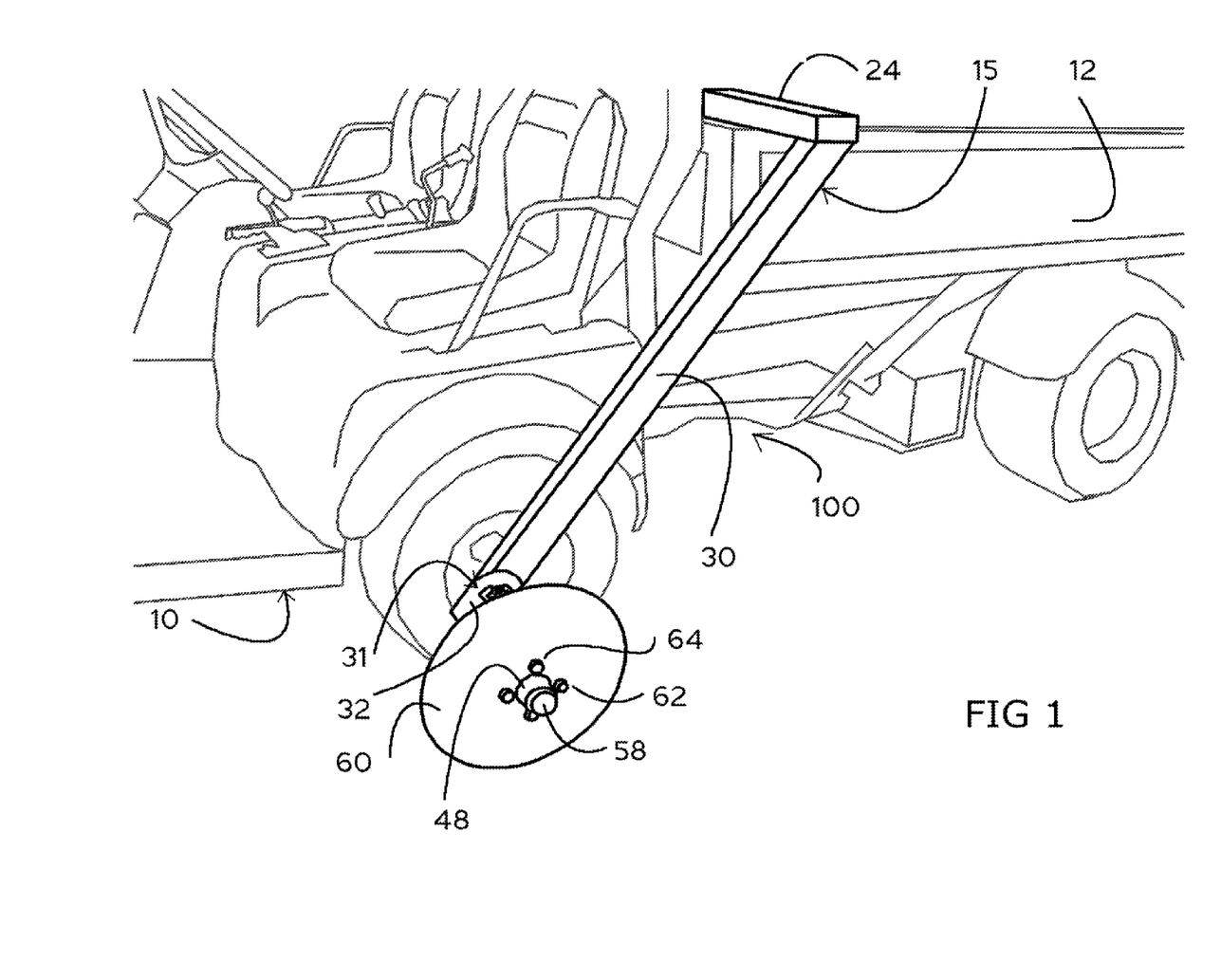
FIG. 1 is a front isometric view of the vehicle mounted edging device, according to some embodiments.
Figure 2:
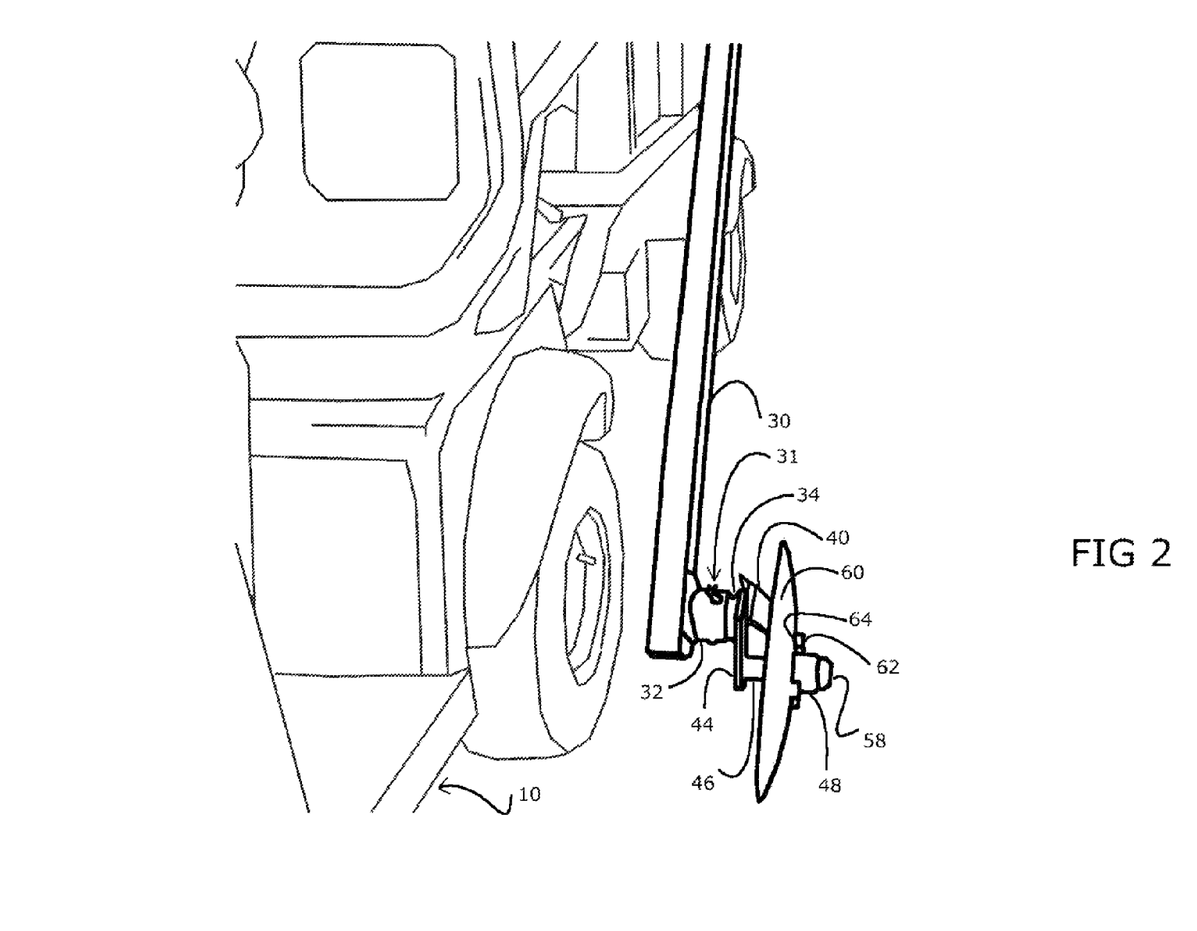
FIG. 2 is a closeup front isometric view of the disc, hub assembly, pivot assembly, and cutting arm of the vehicle mounted edging device (of FIG. 1), according to some embodiments.
Figure 3:
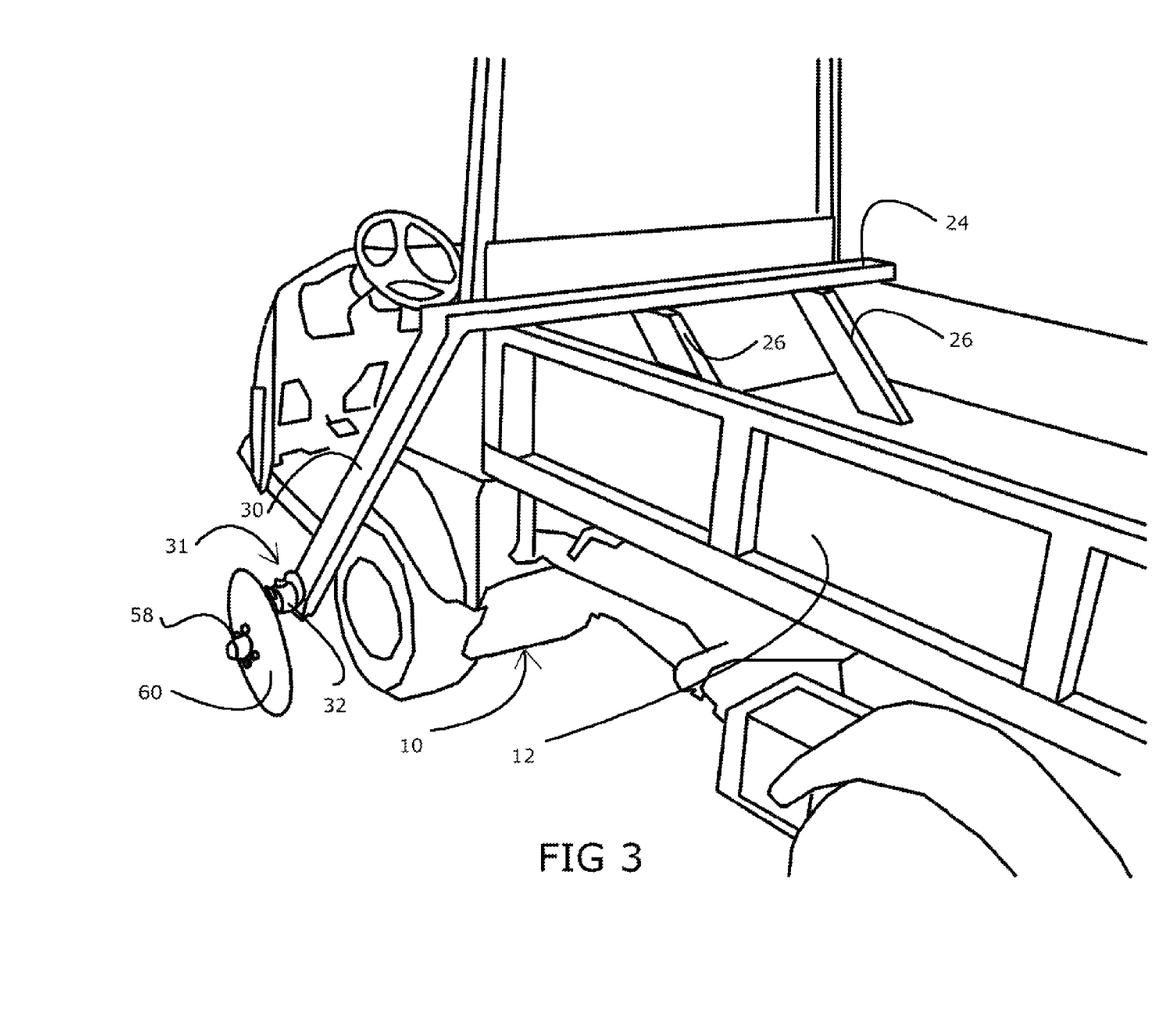
FIG. 3 is a rear isometric view of the vehicle mounted edging device (of FIG. 1), according to some embodiments.
Figure 4:
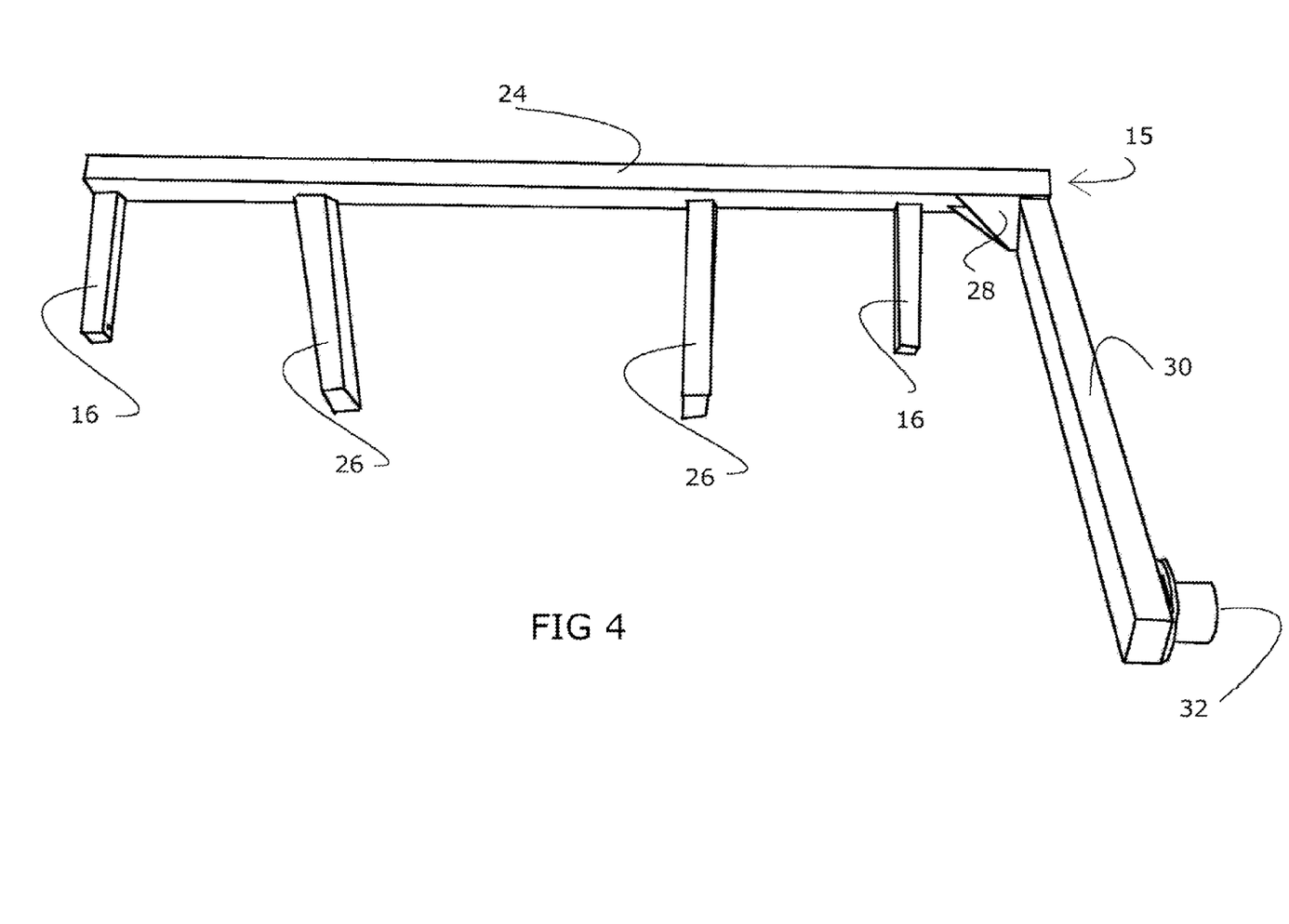
FIG. 4 is a front isometric view of the body of the vehicle mounted edging device (of FIG. 1), according to some embodiments.
Figure 5:
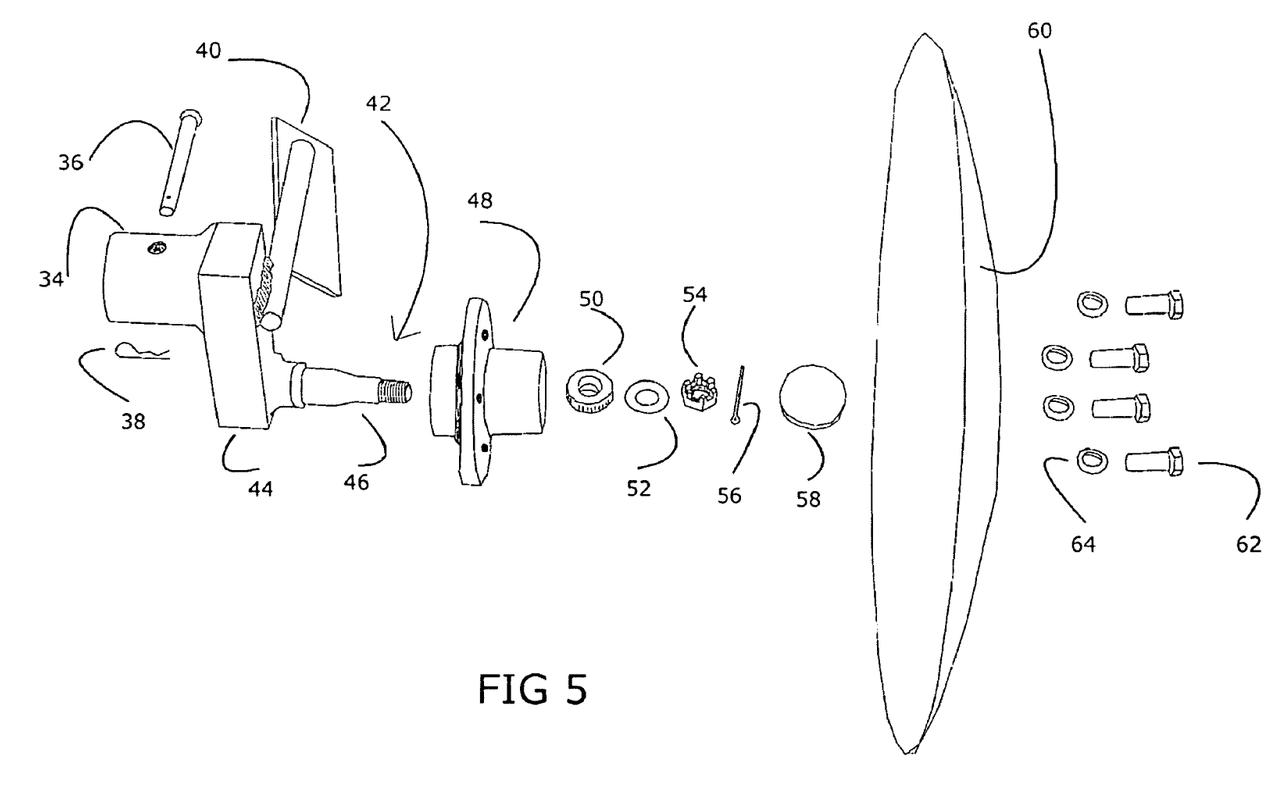
FIG. 5 is an exploded view of the dynamic housing, hub assembly, and disc of the vehicle mounted edging device (of FIG. 1), according to some embodiments.
Figure 6:
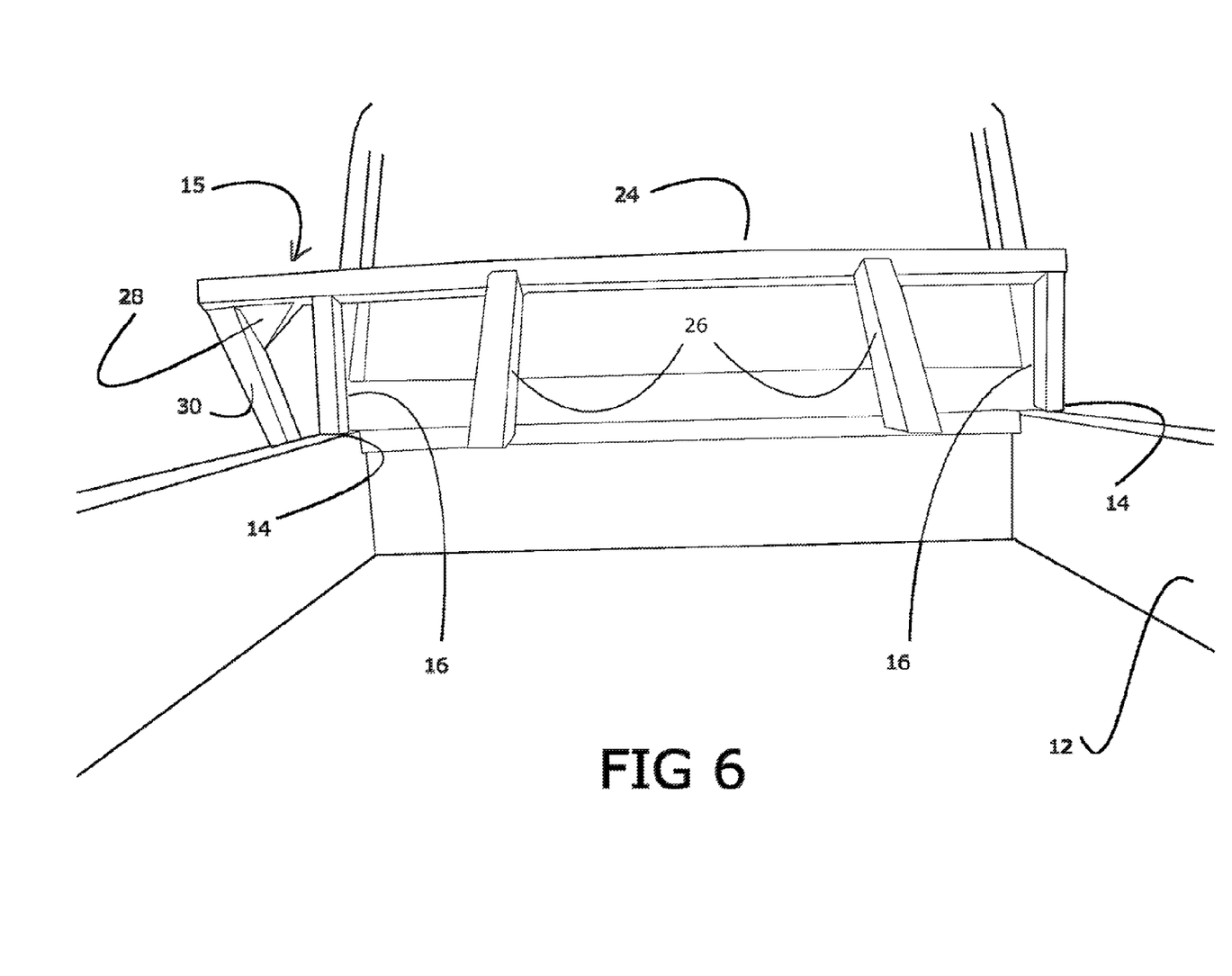
FIG. 6 is a rear isometric view of the vehicle mounted edging device suspended above the remotely actuated bed of the utility vehicle (of FIG. 1), according to some embodiments.
Figure 7A:
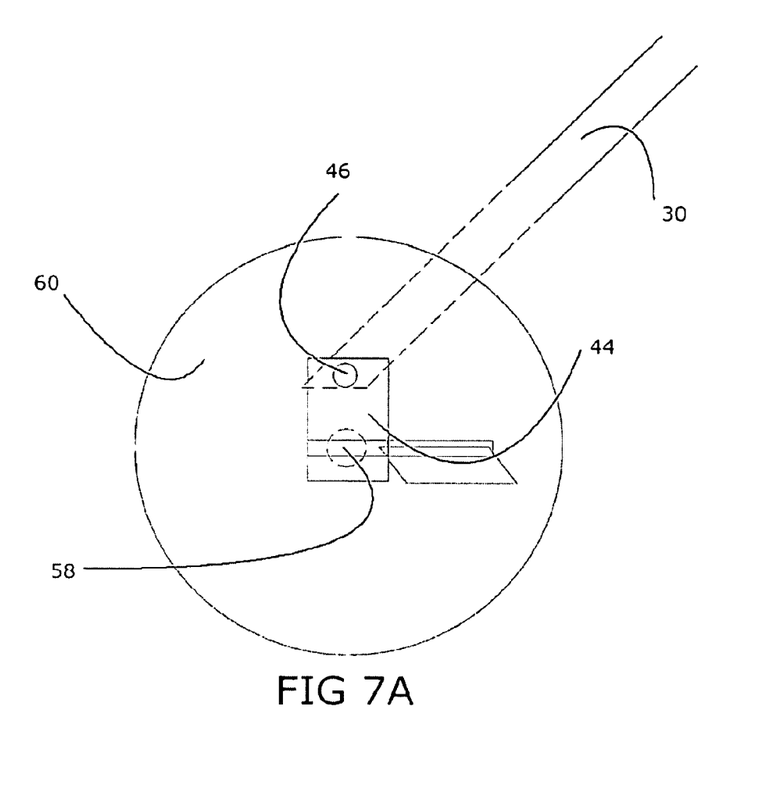
FIGS. 7A and 7B are schematic side views that illustrate the edging mode and transport mode, respectively, of the vehicle mounted edging device (of FIG. 1), according to some embodiments.
Figure 7B:
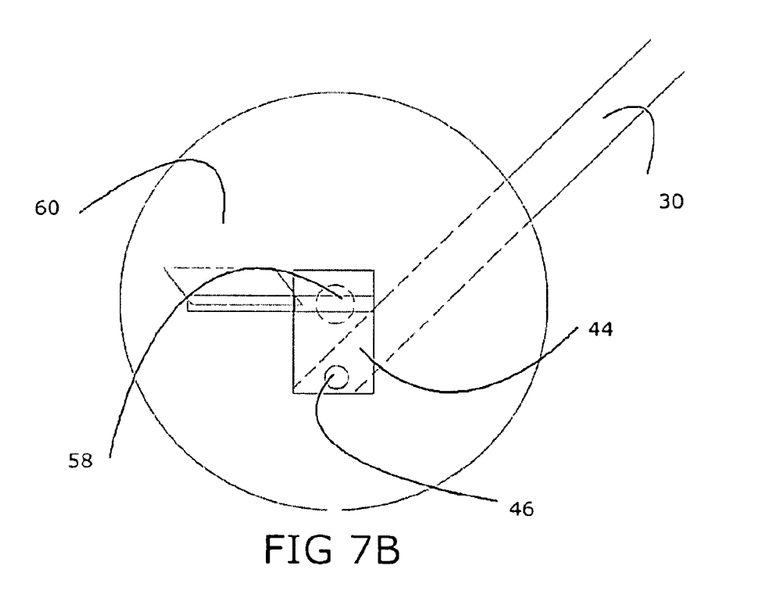
Figure 8:
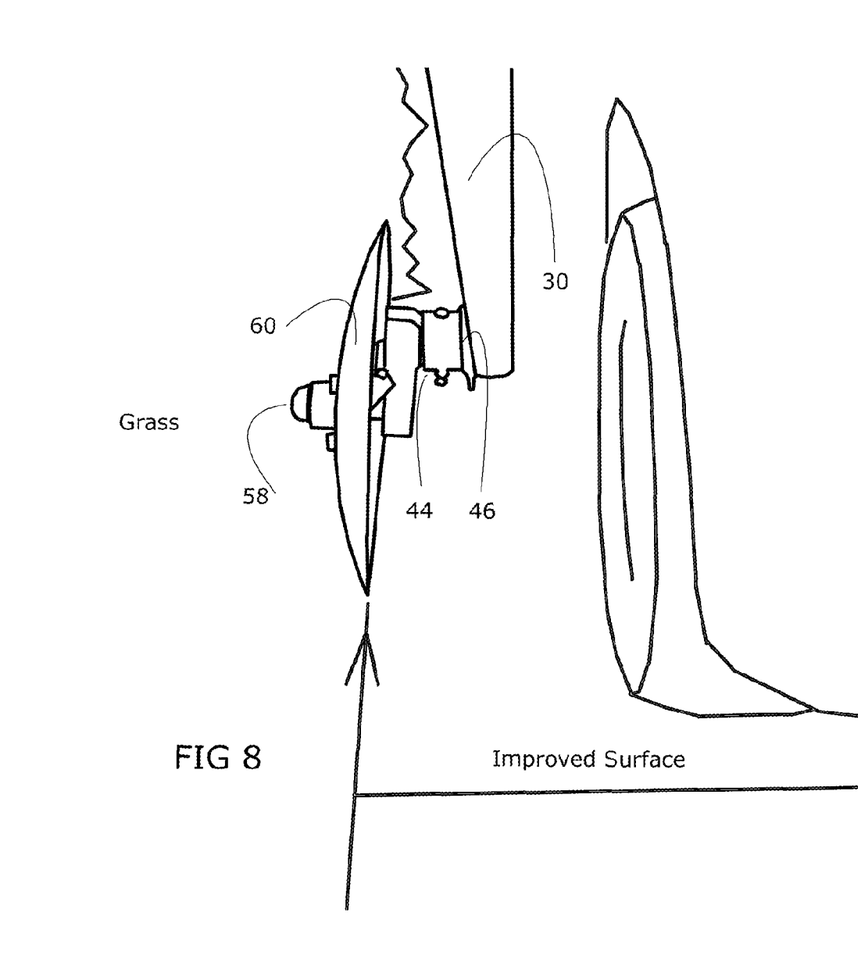
FIG. 8 is a rear view of the disc of the vehicle mounted edging device (of FIG. 1) as it appears during the edging operation, according to some embodiments.

A vehicle mounted edging device 100, as illustrated in FIGS. 1-8, is installed on a conventional utility vehicle 10, according to some embodiments. FIG. 1 is a front isometric view of the vehicle mounted edging device, according to some embodiments. FIG. 2 is a closeup front isometric view of the disc, hub assembly, pivot assembly, and cutting arm of the vehicle mounted edging device (of FIG. 1), according to some embodiments. FIG. 3 is a rear isometric view of the vehicle mounted edging device (of FIG. 1), according to some embodiments. FIG. 4 is a front isometric view of the body of the vehicle mounted edging device (of FIG. 1), according to some embodiments. FIG. 5 is an exploded view of the dynamic housing, hub assembly, and disc of the vehicle mounted edging device (of FIG. 1), according to some embodiments. FIG. 6 is a rear isometric view of the vehicle mounted edging device suspended above the remotely actuated bed of the utility vehicle (of FIG. 1), according to some embodiments. FIGS. 7A and 7B are schematic side views that illustrate the edging mode and transport mode, respectively, of the vehicle mounted edging device (of FIG. 1), according to some embodiments. FIG. 8 is a rear view of the disc of the vehicle mounted edging device (of FIG. 1) as it appears during the edging operation, according to some embodiments.

As shown in FIGS. 1-8, the vehicle mounted edging device 100 includes a body 15, a pivot assembly 31, a hub assembly 42, a cleaning mechanism 40, and a disc 60. The body 15 is comprised of mounting arms 16, a primary member 24, stabilizing arms 26, an arm brace 28, and a cutting arm 30. The pivot assembly 31 is comprised of a static housing 32, a dynamic housing 34, a pin 36, and a key 38. The hub assembly 42 is comprised of a hub arm 44, a spindle 46, a hub 48, and a bearing 50. Elements 15, 31, 42, 40, and 60 are generally composed of carbon steel, although any or all of these elements may alternately be composed of any high strength metal or composite material including an amalgam of different metals or materials.

Referring specifically to FIG. 1, the vehicle mounted edging device 100 is attached to a utility vehicle 10 that includes a vertically moveable, remotely actuated bed 12. As shown in FIG. 1, the body 15 is the structure that mounts to the remotely actuated bed 12 of the utility vehicle 10. The body 15 includes the primary member 24, the mounting arms 16 (Ref. FIG. 4), the stabilizing arms 26 (Ref. FIGS. 3 and 4), and the cutting arm 30. Each of these components are constructed of box iron having a ⅜ inch wall thickness. Therefore, they all have rectangular cross-sections and are generally shaped like rectangular prisms. Other materials of varying cross-sectional shapes and sizes may be substituted provided: the material is of suitable strength, the mounting arms 16 fit snugly inside the slots 14 or an equivalent modification thereof, and the disc 60 is positioned proximal to the operator. All components of body 15 are rigidly and permanently secured to each other through fastening means, such as welding. The stabilizing arms 26 and cutting arm 30 are mounted onto the primary member 24 on 90 degree angles as measured laterally with respect to the utility vehicle 10 (Ref. FIG. 4). The mounting arms 16 are mounted normal to the primary member 24 (Ref. FIG. 4).

The primary member 24 is the central structural element for the body 15. The primary member 24 has the following approximate dimensions: 62½×2×4 inches. The primary member 24 is positioned horizontally across the width of the remotely actuated bed 12 so that the longest dimension of the primary member 24 is oriented laterally (i.e. across the width of the remotely actuated bed 12). The primary member 24 is oriented so the greatest cross-sectional dimension (4 inches) touches the upper forward portion of the remotely actuated bed 12. The primary member 24 serves as the component to which the mounting arms 16, the stabilizing arms 26, and the cutting arm 30 (Refer to FIG. 4) are attached. Each of these components are secured on the lower side of the primary member 24.

The upper end of the cutting arm 30 is secured to the end of the primary member 24 on the operator side. The cutting arm 30 is mounted on a 60 degree angle, measured from to the horizon. The cutting arm 30 has the following approximate dimensions: 43½×2×3 inches. As shown in FIGS. 1 and 2, the lower end of the cutting arm 30 is positioned proximal to the left front wheel of the utility vehicle 10. The pivot assembly 31 is securely attached to the outboard side of the cutting arm 30 at the lower end of the cutting arm 30.

The pivot assembly 31 includes the static housing 32, the dynamic housing 34, the pin 36, and the key 38. The static housing 32 and dynamic housing 34 are both hollow cylindrically shaped components having a wall thickness of approximately ⅜ inches and a length of approximately 2½ inches. The inner diameter of the static housing 32 is approximately equal to the outer diameter of the dynamic housing 34. These diameters measure approximately 2¼ inches. The clearance between the dynamic housing 34 and the static housing 32 should be snug. However, the clearance should allow the dynamic housing 34 to be rotated inside the static housing 32 as needed to manually transition the disc 60 from edging mode (FIG. 7A) to transport mode (FIG. 7B). The pivot assembly 31 is mounted with its rotational axis normal to the outboard surface of the cutting arm 30.

The static housing 32 and the dynamic housing 34 each have two opposing apertures (i.e. 180 degrees apart). The apertures are aligned such that a fastener, such as the pin 36, can be inserted through the static housing 32 and dynamic housing 34 and secured by the key 38. The dynamic housing 34 can be manually configured in two distinct angular orientations with respect to the static housing 32. Other fastening means may be utilized to effectuate this purpose.

The hub assembly 42 is securely attached to the dynamic housing 34. The hub assembly 42 includes the hub arm 44, the spindle 46, the bearing 50, a washer 52, a nut 54, a key 56, and a grease cap 58 (Ref. FIG. 5). As shown in FIG. 2, the hub assembly 42 is the rotational connection between the dynamic housing 34 and the disc 60. The hub arm 44 is generally shaped like a rectangular prism having approximate dimensions of 6×2½×1½ inches. The hub arm 44 is solid carbon steel. Other materials or cross-sectional shapes may be substituted provided the substitution yields a component with equal or greater strength. The spindle 46 is securely mounted normal to the outboard surface of the hub arm 44.

The spindle 46, the bearing 50, the washer 52, the nut 54, the key 56, and the grease cap 58 are commercially available as an assembly. Other similar configurations or compilations of components may be supplemented, provided that the substitution can withstand the forces imposed by the utility vehicle 10 during the edging operation.

As shown in FIGS. 1-3, the disc 60 is removably mounted on the hub assembly 42 using fasteners such as bolts 62 and washers 64. The disc 60 may also be secured using threaded studs and lug nuts. The disc 60 used for the vehicle mounted edging device 100 as shown is a 20 inch diameter plow disc, with material removed as necessary to accommodate the hub 48 and the bolts 62. The disc 60 is has a relatively thin profile, a circular shape, a concave surface, and a convex surface. The disc 60 is oriented in a vertical plane with the concave surface of the disc 60 facing the utility vehicle 10. Accordingly, the concave side of the disc 60 is adjacent to the improved surface and the convex side of the disc 60 is adjacent to the natural surface when the vehicle mounted edging device 100 is in use. Other shapes, such as a disc having scallops, a disc that is flat, or a disc with two convex surfaces, may serve as suitable replacements in unique applications.

As shown in FIGS. 3-4, the vehicle mounted edging device 100 includes two mounting arms 16. The mounting arms 16 have the following approximate dimensions: 10½×1½×2 inches and are rigidly attached to the bottom side of the primary member 24 on opposed sides of the utility vehicle 10. The mounting arm 16 on the passenger side of the primary member 24 is permanently secured at the end of the primary member 24 whereas the mounting arm 16 on the operator side of the primary member 24 is permanently secured approximately 8¼ inches inboard from the end of the primary member 24. As a result, the primary member 24 is aligned evenly with the edge of the remotely actuated bed 12 on the passenger side and extends beyond the edge of the remotely actuated bed 12 on the operator side. The extension on the operator side provides sufficient clearance for the operator to enter and exit the utility vehicle 10. The extension further provides clearance necessary for the front wheel of the utility vehicle 10 to turn for steering purposes.

In some embodiments, the vehicle mounted edging device 100 also includes a cleaning mechanism 40 as shown in FIG. 5. The cleaning mechanism 40 is comprised of a small rectangular plate (measuring approximately 6×2½×⅜ inches) securely attached to a small rod (measuring approximately 12 inches long, ½ inch diameter). The cleaning mechanism 40 removes soil and debris that remains attached to the concave surface of the disc 60 in some applications of the vehicle mounted edging device 100. Therefore, the cleaning mechanism 40 is oriented so that the small rectangular plate is proximal to the concave surface of the disc 60. In some embodiments, the cleaning mechanism 40 is located ½ from the surface of the disc 60. The cleaning mechanism 40 is constructed of carbon steel and is welded to the hub arm 44. Other materials may be utilized to effectuated the purpose of the cleaning mechanism.

A vehicle mounted edging device 100, shown in FIG. 6, is attached to a pair of slots 14 typically located at the forward corners of the remotely actuated bed 12, according to some embodiments. The attachment is effectuated by inserting the mounting arms 16 into the slots 14 and securing each mounting arm 16 with fasteners, such as bolts 18, flat washers 20, and lock washers 22. The bolts 18 are inserted into threaded holes in the mounting arms 16. Corresponding holes (without threads) are placed in the bed 12 to allow clearance for the bolts 18. The bolt 18 has a ½ inch diameter and is 2½ inches long. The flat washer 20 has a ½ inch diameter hole and a 1½ inch outer diameter. The lock washer 22 has a ½ inch diameter hole and a 1 inch outer diameter. In the event that the utility vehicle 10 does not have slots 14 located in the forward-most corners of the bed 12, brackets can be utilized to secure the mounting arms 16 to the bed 12.

Once attached the utility vehicle 10, the operator drives the utility vehicle 10 to a particular location to start the edging process. While the utility vehicle 10 is in transport, the disc 60 is configured in transport mode as illustrated in FIG. 7B. Once the operator arrives at the location, the operator manually reconfigures the disc 60 to edging mode as illustrated in FIG. 7A.

In edging mode, the operator positions the utility vehicle 10 so that the disc 60 is situated between the improved surface and the surface to be edged as shown in FIG. 8. In order to perform the edging task, the operator positions the disc 60 and begins to drive the utility vehicle 10 in a forward direction as indicated by the arrow in FIG. 8. The depth of the edging process is controlled by manipulating the position of the remotely actuated bed 12 which in turn raises and/or lowers the height of the disc 60. The ability to vary the height of the disc 60 using the remotely actuated bed 12 allows the operator to easily position the disc 60 between the improved surface and the surface being edged. As the utility vehicle 10 moves down the path, the vehicle mounted edging device 100 effectively guides the utility vehicle 10 along the edge of the path so that very little steering is required.

The previously described versions of the present invention have many advantages. One advantage of the invention is that no auxiliary power is needed to operate the device. The device utilizes the existing power of the utility vehicle to raise and lower the assembly and utilizes the forward linear motion of the vehicle to effectuate the rotation of the disc. Also, the device does not require any significant manual exertion from the operator while performing the edging operation.

Another advantage of the invention is that the edging device is positioned within clear view of the operator and does not impair the forward vision of the operator. The location of the disc in close proximity to the operator's seat allows the operator to easily monitor the edging operation while driving.

Yet another advantage of the invention is that the device is strong and durable. The strength of the design is important because it allows the operator to rely somewhat on the device to assist in steering the vehicle. This feature is beneficial because it alleviates the difficulty of maintaining a precise path during an edging operation. As a result, the operator is able to complete the operation in a more efficient manner.

Still another advantage of the device is that is comprised of a minimum number of moving components subject significant wear or failure over time. The majority of the components are constructed using simple raw materials or are commercially available parts. Accordingly, the device has a limited number of uncomplicated components that can be easily procured or manufactured.

Yet another advantage of the invention is little or no modification to the utility vehicle is required for installation and it is easy to install and remove. This ease of installation promotes operational efficiency and versatility for the user. The invention itself is also versatile because it may be designed using customized dimensions for a variety of styles and sizes of utility vehicles.

Another significant advantage of the invention is that it significantly increases the efficiency of edging improved surface areas that traverse great distances. For example, the cycle time for edging an 18 hole golf course was reduced from several months (base upon two people using hand-held devices during standard working hours) to 4½ hours by one operator using the invention.

While the invention has been described with respect to a limited number of embodiments, those skilled in the art will appreciate numerous modifications and variations therefrom. It is intended that the appended claims cover all such modifications and variations as fall within the true spirit and scope of the invention. Any element in a claim that does not explicitly state "means for" performing a specified function is not intended to be interpreted as a "means" clause as specified in 35 U.S.C. §112, ¶6.

I claim:

1. A vehicle mounted edging device adapted to be secured to a remotely actuated bed on a utility vehicle, the vehicle mounted edging device comprising:
   (a) a body;
   (b) a pivot assembly secured to the body;
   (c) a hub assembly secured to the pivot assembly; and
   (d) a disc secured to the hub assembly, the disc positioned proximal to a left front wheel of the utility vehicle, wherein the vehicle mounted edging device is removably attached to the remotely actuated bed of the utility vehicle and the position of the disc is vertically manipulated using the remotely actuated bed of the utility vehicle.

2. A vehicle mounted edging device adapted to be secured to a remotely actuated bed on a utility vehicle, the vehicle mounted edging device comprising:
   (a) a body;
   (b) a pivot assembly secured to the body;
   (c) a hub assembly secured to the pivot assembly;
   (d) a disc secured to the hub assembly, the disc positioned proximal to a left front wheel of the utility vehicle wherein the vehicle mounted edging device is removably attached to the remotely actuated bed of the utility vehicle and the position of the disc is vertically manipulated using the remotely actuated bed of the utility vehicle; and
   (e) a cleaning mechanism secured to the hub assembly.

3. A vehicle mounted edging device adapted to be secured to a remotely actuated bed on a utility vehicle, the vehicle mounted edging device comprising:
   (a) a body comprising a plurality of mounting arms, a primary member secured to the plurality of mounting arms, a plurality of stabilizing arms attached to the primary member, a cutting arm attached to the primary member, said cutting arm oriented approximately 60 degrees from horizontal and having a lower end proximal to a left front wheel of the utility vehicle, and an arm brace attached to the primary member and the cutting arm;
(b) a pivot assembly secured to the lower end of the cutting arm, the pivot assembly comprising a static housing and a dynamic housing wherein the dynamic housing is positioned inside the static housing and is capable of rotating angularly inside said static housing and being secured in a plurality of orientations;
(c) a hub assembly secured to the pivot assembly, the hub assembly comprising a hub arm, a spindle secured to the hub arm, a hub and a bearing positioned on the spindle; and
(d) a disc secured to the hub, the disc oriented so that it rotates in a substantially vertical plane wherein the vehicle mounted edging device is removably attached to the remotely actuated bed of the utility vehicle and the position of the disc is vertically manipulated using the remotely actuated bed of the utility vehicle.

4. A vehicle mounted edging device of claim 1 wherein the disc has a concave surface and a convex surface, said concave surface oriented adjacent to the utility vehicle.

5. A vehicle mounted edging device of claim 2 wherein the disc has a concave surface and a convex surface, said concave surface oriented adjacent to the utility-vehicle.

6. A vehicle mounted edging device of claim 3 wherein the disc has a concave surface and a convex surface, said concave surface oriented adjacent to the utility-vehicle.

7. A vehicle mounted edging device of claim 1 wherein the disc has a convex shape.

8. A vehicle mounted edging device of claim 2 wherein the disc has a convex shape.

9. A vehicle mounted edging device of claim 3 wherein the disc has a convex shape.

* * * * *